(12) United States Patent
Ochi

(10) Patent No.: US 10,977,543 B2
(45) Date of Patent: Apr. 13, 2021

(54) RFID SYSTEM

(71) Applicant: Murata Manufacturing Co., Ltd., Nagaokakyo (JP)

(72) Inventor: Tatsuya Ochi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/896,482

(22) Filed: Jun. 9, 2020

(65) Prior Publication Data

US 2020/0302260 A1 Sep. 24, 2020

Related U.S. Application Data

(63) Continuation of application No. PCT/JP2019/021781, filed on May 31, 2019.

(30) Foreign Application Priority Data

Oct. 24, 2018 (JP) .............................. JP2018-200261

(51) Int. Cl.
*G06K 19/077* (2006.01)
*H01Q 1/22* (2006.01)
(Continued)

(52) U.S. Cl.
CPC ........ *G06K 19/0775* (2013.01); *H01Q 1/2208* (2013.01); *H01Q 7/00* (2013.01)

(58) Field of Classification Search
CPC ........ G06K 19/00; G06K 19/04; G06K 19/06; G06K 19/067; G06K 19/07
(Continued)

(56) References Cited

U.S. PATENT DOCUMENTS 9,727,765 B2   8/2017   Ikemoto
2012/0206239 A1*  8/2012   Ikemoto ............... H04B 5/0062
                                                        340/10.1

(Continued)

FOREIGN PATENT DOCUMENTS

EP        2879077 A      6/2015
JP        H11203423 A    7/1999
(Continued)

OTHER PUBLICATIONS

International Search Report issued for PCT/JP2019/021781, dated Aug. 13, 2019.

(Continued)

*Primary Examiner* — Edwyn Labaze
(74) *Attorney, Agent, or Firm* — Arent Fox LLP

(57) ABSTRACT

An RFID system includes an RFID tag having a first magnetic field antenna, an article housing the RFID tag in a random direction, a conveying path conveying the article, and a reader/writer having a second magnetic field antenna communicating with the first magnetic field antenna through a magnetic field coupling and disposed along the conveying path. While the conveying path conveys the RFID tag such that an opening plane of the second magnetic field antenna and the RFID tag face each other, the second magnetic field antenna emits a magnetic flux. Moreover, a distance between the RFID tag and the second magnetic field antenna in a normal direction of the second magnetic field antenna is smaller than an opening diameter of the second magnetic field antenna.

20 Claims, 12 Drawing Sheets

(51) Int. Cl.
*H01Q 7/00* (2006.01)
*G06K 19/00* (2006.01)
*G06K 19/07* (2006.01)

(58) Field of Classification Search
USPC .............................. 235/492, 380, 487, 375
See application file for complete search history.

(56) References Cited

U.S. PATENT DOCUMENTS

| | | | | |
|---|---|---|---|---|
| 2015/0356334 | A1* | 12/2015 | Leutgeb | H01Q 1/2216 235/439 |
| 2017/0083804 | A1* | 3/2017 | Kato | H01F 27/292 |
| 2017/0373389 | A1* | 12/2017 | Mandai | H01Q 1/2225 |

FOREIGN PATENT DOCUMENTS

| | | |
|---|---|---|
| JP | 2002057608 A | 2/2002 |
| JP | 2005020360 A | 1/2005 |
| JP | 2014048861 A | 3/2014 |
| WO | 99021144 A1 | 4/1999 |
| WO | 2011118379 A1 | 9/2011 |

OTHER PUBLICATIONS

Written Opinion of the International Searching Authority issued for PCT/JP2019/021781, dated Aug. 13, 2019.

\* cited by examiner

RFID SYSTEM

CROSS REFERENCE TO RELATED APPLICATIONS

The present application is a continuation of PCT/JP2019/021781 filed May 31, 2019, which claims priority to Japanese Patent Application No. 2018-200261, filed Oct. 24, 2018, the entire contents of each of which are incorporated herein by reference.

TECHNICAL FIELD

The present invention relates to an RFID system using an RFID (Radio frequency Identification) tag for performing article information management and communication in a non-contact manner through short-range wireless communication.

BACKGROUND

Conventionally, in a system performing article information management, tag information is communicated between an RFID tag attached to an article and a reader/writer connected to an information management processing system using an electromagnetic field in a non-contact method so as to manage information related to the article.

Antennas formed on RFID tags include two types of antennas: electric field antennas and magnetic field antennas. When an electric field antenna is used, a communication distance can be longer than when a magnetic field antenna is used. However, for the electric field antenna such as a dipole antenna, for example, an antenna pattern having a length of ½ wavelength of a communication frequency is planarly formed.

On the other hand, the magnetic field antenna is more easily reduced in size than the electric field antenna since only a coil-shaped antenna is needed. An example of the magnetic field antenna is described in Patent Document 1.

Patent Document 1: WO 2011/118379.

For the magnetic field antenna, unlike the electric field antenna, communication cannot be performed unless a magnetic flux (i.e., line of magnetic force) of an antenna of a reader/writer passes through the magnetic field antenna. Therefore, an RFID tag attached to an article and the antenna of the reader/writer desirably have a predetermined positional relationship, and the RFID tag needs to be accurately attached. Particularly, when a small-sized magnetic field antenna is attached to an article, a burden of attachment is large.

SUMMARY OF THE INVENTION

Therefore, it is an object of the present invention to provide an RFID system that reduces labor and effort for attaching an RFID tag to an article.

Thus, according to an exemplary aspect of the present invention, an RFID system is provided that includes an RFID tag having a first magnetic field antenna; an article housing the RFID tag in a random direction; a conveying path conveying the article; and a reader/writer having a second magnetic field antenna communicating with the first magnetic field antenna through a magnetic field coupling and disposed along the conveying path. Moreover, while the conveying path conveys the RFID tag such that an opening plane of the second magnetic field antenna and the RFID tag face each other, the second magnetic field antenna emits a magnetic flux. Furthermore, a distance between the RFID tag and the second magnetic field antenna in a normal direction of the second magnetic field antenna is smaller than an opening diameter of the second magnetic field antenna.

According to the RFID system of the exemplary aspects of the present invention, the RFID system is provided that reduces labor and effort for attaching an RFID tag to an article.

DETAILED DESCRIPTION

Figure 1:
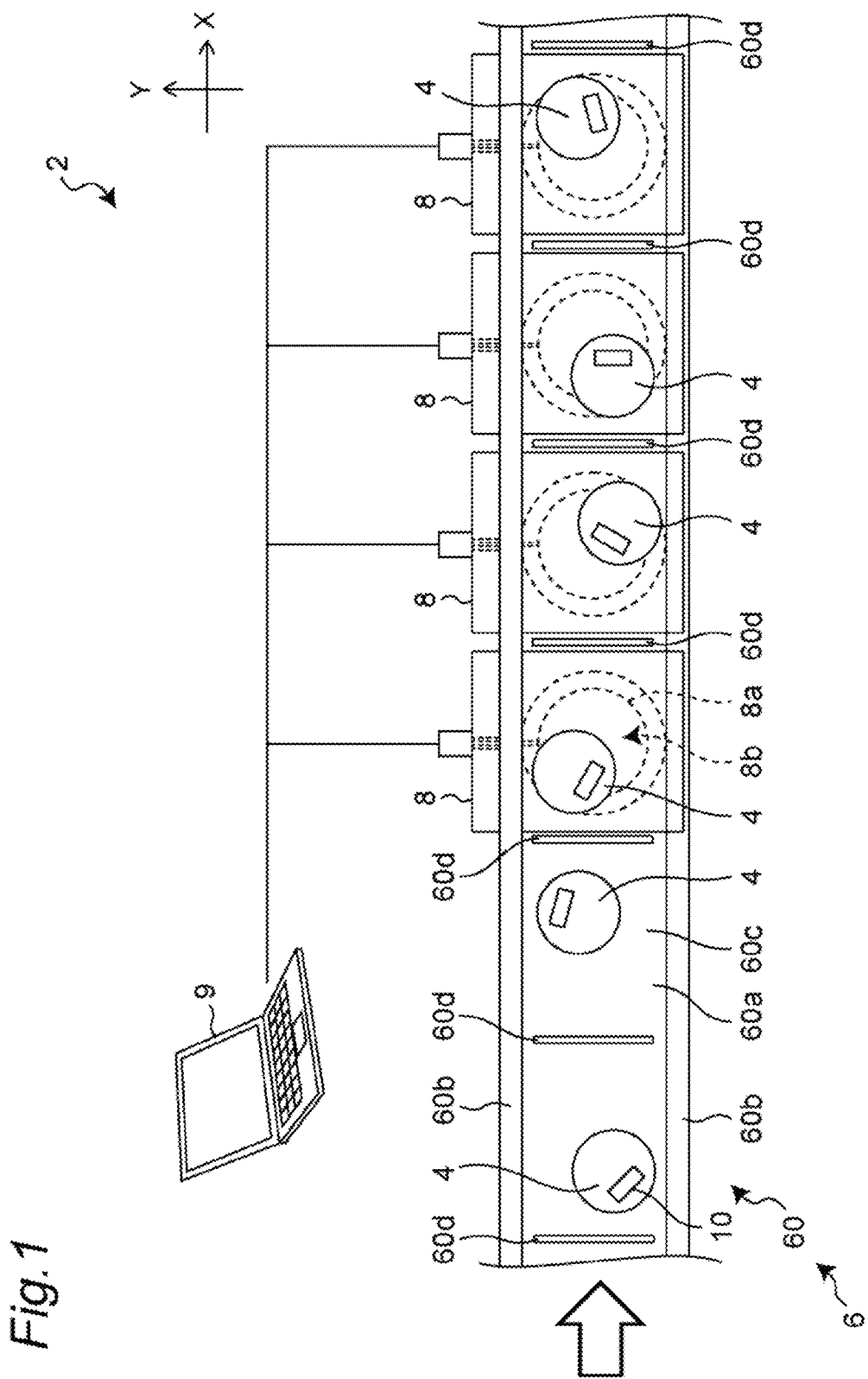
FIG. 1 is a plan view showing an RFID system of a first exemplary embodiment.

An RFID system of an exemplary aspect of the present invention includes an RFID tag having a first magnetic field antenna, an article housing the RFID tag in a random direction, a conveying path conveying the article, and a reader/writer having a second magnetic field antenna communicating with the first magnetic field antenna through a magnetic field coupling and disposed along the conveying path. While the conveying path conveys the RFID tag such that an opening plane of the second magnetic field antenna and the RFID tag face each other, the second magnetic field antenna emits a magnetic flux. Moreover, a distance between the RFID tag and the second magnetic field antenna in a normal direction of the second magnetic field antenna is smaller than an opening diameter of the second magnetic field antenna.

According to the exemplary aspect, the RFID system is provided for reducing labor and effort for attaching an RFID tag to an article.

According to an exemplary aspect, the RFID tag can be housed in a displaceable manner in the article.

According to an exemplary aspect, the RFID tag can be rotatably housed in the article.

According to an exemplary aspect, the conveying path can have a guide part regulating displacement of the RFID tag in a direction intersecting with a conveying direction.

Moreover, a displacement range of the RFID tag according to an exemplary aspect can be within the opening plane of the second magnetic field antenna in planar view.

Furthermore, an opening plane of the first magnetic field antenna of the RFID tag according to an exemplary aspect can be orthogonal to the opening plane of the second magnetic field antenna of the reader/writer.

According to an exemplary aspect, the article can have a curved surface, and the curved surface of the article may bulge out toward the conveying path.

According to an exemplary aspect, the article can be one of a plurality of articles conveyed at predetermined intervals.

According to an exemplary aspect, the reader/writer can be one of a plurality of reader/writers arranged along the conveying direction.

In an exemplary aspect, an antenna controller for controlling the plurality of reader/writers can be included, and the antenna controller can be configured to provide control such that a magnetic flux is emitted with a time lag from the plurality of reader/writers adjacent to each other.

An RFID system according to exemplary aspects of the present invention will now be described with reference to the drawings. In the drawings, members having substantially the same function and configuration are denoted by the same reference numeral and may not be described in the description. To facilitate understanding, the drawings are schematic representations mainly showing respective constituent elements.

All the exemplary embodiments described below show specific examples of the present invention, and the present invention is not limited to these configurations. Moreover, it is noted that numerical values, shapes, configurations, steps, order of steps, etc. specifically described in the following embodiments are merely examples and do not limit the present invention. In all the exemplary embodiments, the same applies to configurations in respective modifications, and the configurations described in the modifications can be combined with each other.

First Exemplary Embodiment

An RFID (Radio-Frequency IDentification) system according to a first exemplary embodiment of the present invention will hereinafter be described. FIG. 1 is a plan view showing the RFID system of the first embodiment. In the drawings, an X-Y-Z coordinate system is for facilitating understanding of the invention and does not limit the invention. An X-axis direction indicates a longitudinal direction of a belt conveyor 60, that is, the exemplary conveying direction of the articles 4, a Y-axis direction indicates a width direction of the belt conveyor 60 (that is perpendicular to the X-axis direction), and a Z-axis direction indicates a height direction of the belt conveyor 60. The X, Y, and Z directions are orthogonal to each other.

<RFID System>

An RFID system 2 includes an RFID tag 10, a conveying device 6 conveying articles 4 each having the RFID tag 10 housed therein, reader/writers 8 communicating with the RFID tags 10, and a personal computer 9 configured for managing data communicated with the RFID tag 10.

According to the exemplary aspect, the conveying device 6 includes a belt conveyor 60 serving as a conveying path conveying the articles 4, and a drive part (not shown) driving the belt conveyor 60 in a conveying direction (i.e., the X direction).

The articles 4 can have a spherical shape, a cylindrical shape, or an ellipsoidal shape, for example, and is rotatable. In the first embodiment, an RFID system used in an inspection system using the spherical articles 4 will be described as an example. An ID number, an inspection history, and the like of a sample to be inspected are read from and written to the RFID tag 10 as RFID tag information.

The belt conveyor 60 includes a resin belt part 60a on which the articles 4 are placed, and plate-shaped guide parts 60b for preventing the articles 4 on the belt part 60a from falling out to both lateral sides. The guide parts 60b regulate displacements of the articles 4 and the RFID tags 10 housed inside the articles 4 in a direction intersecting with the conveying direction. Projecting parts 60d projecting upward are formed at predetermined pitches on a surface 60c of the belt part 60a. The projecting parts 60d are an example configuration provided for preventing the articles 4 from being arranged side by side in the width direction of the belt part 60a. Therefore, the RFID tags 10 are not arranged side by side in the width direction of the belt part 60a. During operation, the belt part 60a is configured to move in the conveying direction together with the articles 4, passes over the reader/writers 8, and then folds back to move in a direction opposite to the conveying direction. In this way, the belt part 60a conveys the articles 4 while circulating.

The drive part (not shown) driving the belt conveyor 60 has a common structure as known to those skilled in the art and therefore will not be described in detail. In the drive part, for example, a drive pulley driven by a motor drives the belt part 60a in the conveying direction.

Figure 6:
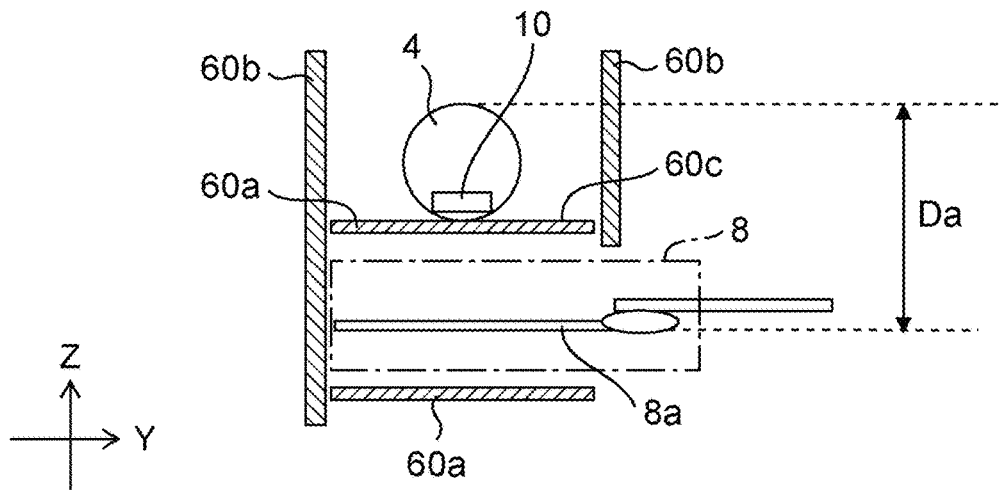
FIG. 6 is an explanatory diagram showing a positional relationship between the article and the reader/writer.

The reader/writers 8 wirelessly communicating with the RFID tag 10 housed in the article 4 are arranged between the belt part 60a moving in the conveying direction of the belt conveyor 60 and the belt part 60a returning in the direction opposite to the conveying direction (see FIG. 6). For example, the multiple reader/writers 8 are arranged along the belt conveyor 60, and in the first embodiment, the four reader/writers 8 are arranged. The reader/writers 8 are connected to the personal computer 9 managing the tag information. The wireless communication between the RFID tag 10 and the reader/writer 8 includes either one or both of reading the tag information from the RFID tag 10 by the reader/writer 8 and writing the tag information from the reader/writer 8 to the RFID tag 10.

<Article>

Figure 2:
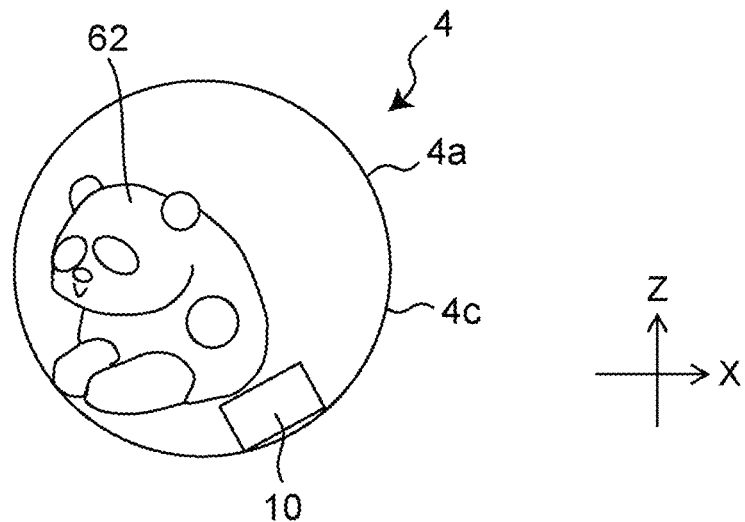
FIG. 2 is an explanatory diagram showing an example of an article.

FIG. 2 is an explanatory diagram showing an example of the article 4. For example, the article 4 has a spherical case 4a hollow inside, and a toy 62 housed inside the case 4a. The RFID tag 10 is also housed inside the case 4a of the article 4. It should be appreciated that an object other than the toy 62 may be housed inside the case 4a. The RFID tag 10 may be embedded inside the toy 62. The case 4a has a curved surface 4c, and the curved surface 4c of the article 4 bulges out toward the belt part 60a of the belt conveyor 60.

Even though the case 4a does not rotate, the RFID tag 10 can be displaced therein. The RFID tag 10 can also be displaced in accordance with the rotation of the case 4a.

Figure 3:
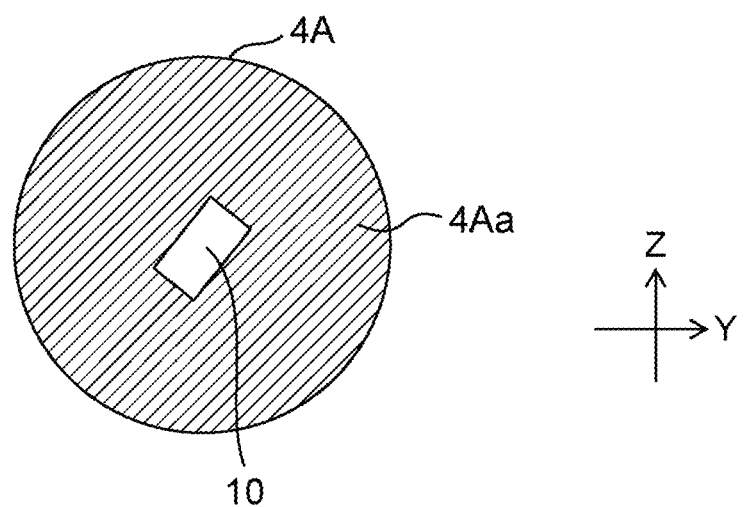
FIG. 3 is an explanatory diagram showing an example of an article.

FIG. 3 is an explanatory diagram showing an example of an article 4A that is a modification of the article 4. For example, the article 4A is a spherical ball having the inside filled with a filler 4Aa. The RFID tag 10 is embedded and fixed inside the article 4A. in an exemplary aspect, the filler 4Aa can be a curable member such as resin or a fiber member such as cotton, for example.

The RFID tag 10 is embedded inside the article 4A and therefore limited in terms of displacement within the article 4A. However, when embedded in the article 4A, the posture of the RFID tag 10 is not fixed with respect to the article 4A. Additionally, when the article 4A rotates, the RFID tag 10 also rotates.

Figure 4:
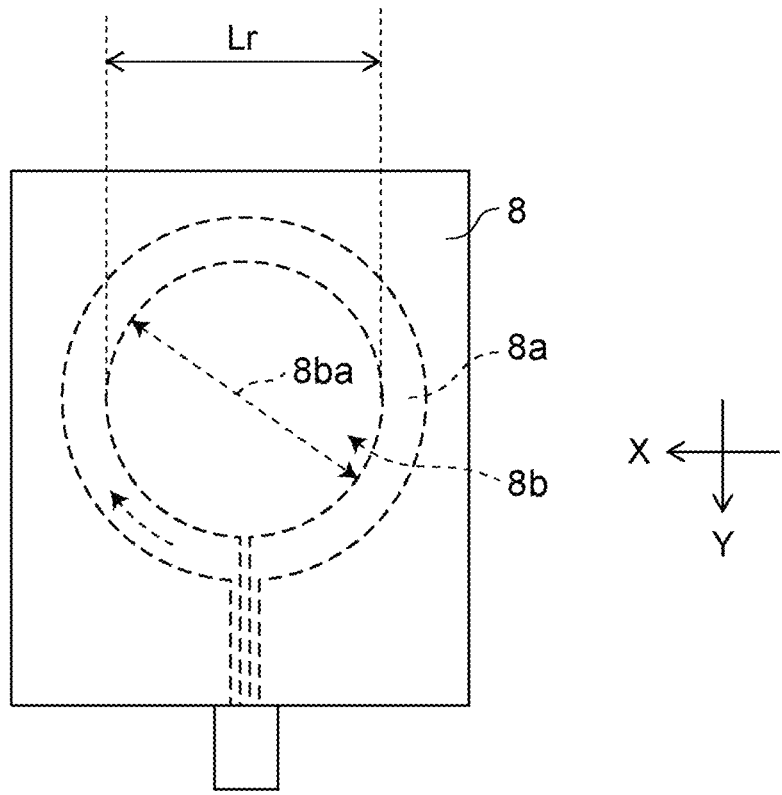
FIG. 4 is a plan view of a reader/writer.

FIG. 4 is a plan view of the reader/writer 8. The reader/writer 8 has a magnetic field antenna 8a as a second magnetic field antenna of the present invention. The magnetic field antenna 8a has a loop-shaped conductor. An opening plane 8ba of the magnetic field antenna 8a is arranged parallel to a conveying surface. The opening plane 8ba of the magnetic field antenna 8a is a plane of an opening 8b region surrounded by the loop-shaped conductor. In FIG. 4, when a current flows clockwise through the magnetic field antenna 8a, a magnetic flux Br (see FIG. 5) passing vertically downward through the opening 8b of the magnetic field antenna 8a is generated. An opening diameter Lr of the magnetic field antenna 8a is 50 mm, for example, or can change depending on a size of the article to be detected. The loop shape means that start and end points of the conductor are close to each other in planar view and includes not only a circular shape ,but also a rectangular shape and a coil shape, for example.

Figure 5:
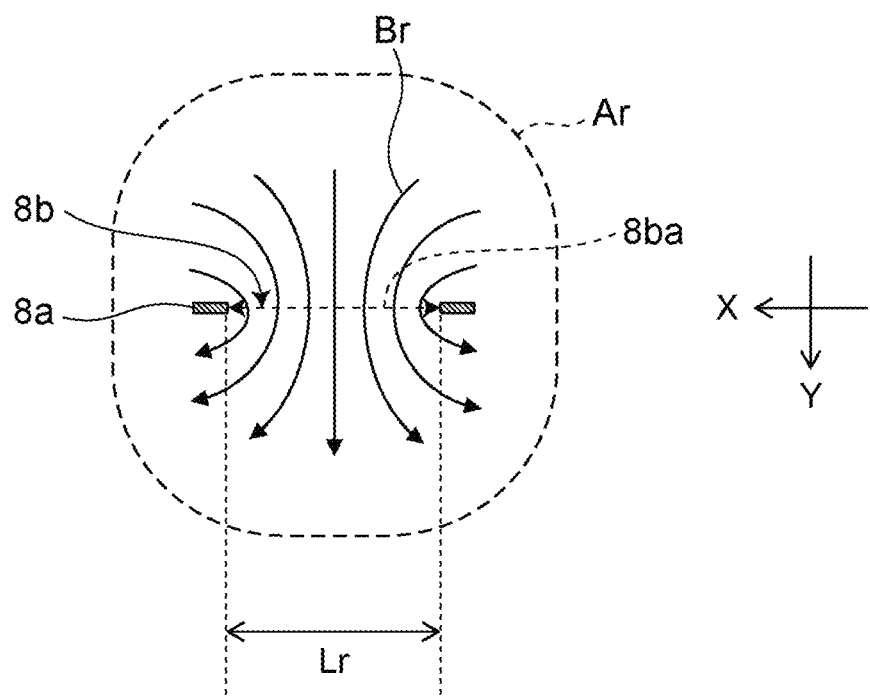
FIG. 5 is an explanatory diagram for explaining a magnetic flux generated from the reader/writer.

FIG. 5 is an explanatory diagram for explaining the magnetic flux Br generated from the reader/writer 8. When a current flows through the magnetic field antenna 8a of the reader/writer 8, the magnetic flux Br passing through the opening 8b of the magnetic field antenna 8a is generated. A region Ar surrounded by a broken line indicates a range in which communication can be performed with the RFID tag 10 through the magnetic flux Br. Therefore, the region Ar is a communicable region of the reader/writer 8.

FIG. 6 is an explanatory diagram showing a positional relationship in the height direction between the article 4 and the reader/writer 8. The conveyance of the article 4 is set such that the RFID tag 10 passes directly above the magnetic field antenna 8a. The magnetic field antenna 8a is arranged close to the RFID tag 10 stored in the conveyed article 4. According to the exemplary aspect, the distance Da between an uppermost end of the article 4 and the magnetic field antenna 8a in the normal direction of the magnetic field antenna 8a is smaller than the diameter of the opening 8b of the magnetic field antenna 8a. Specifically, in the first embodiment, the distance Da is 50 mm or less, for example. If a metal plate is disposed under the magnetic field antenna 8a, the metal plate and the magnetic field antenna 8a are preferably separated by 50 mm or more.

Figure 7:
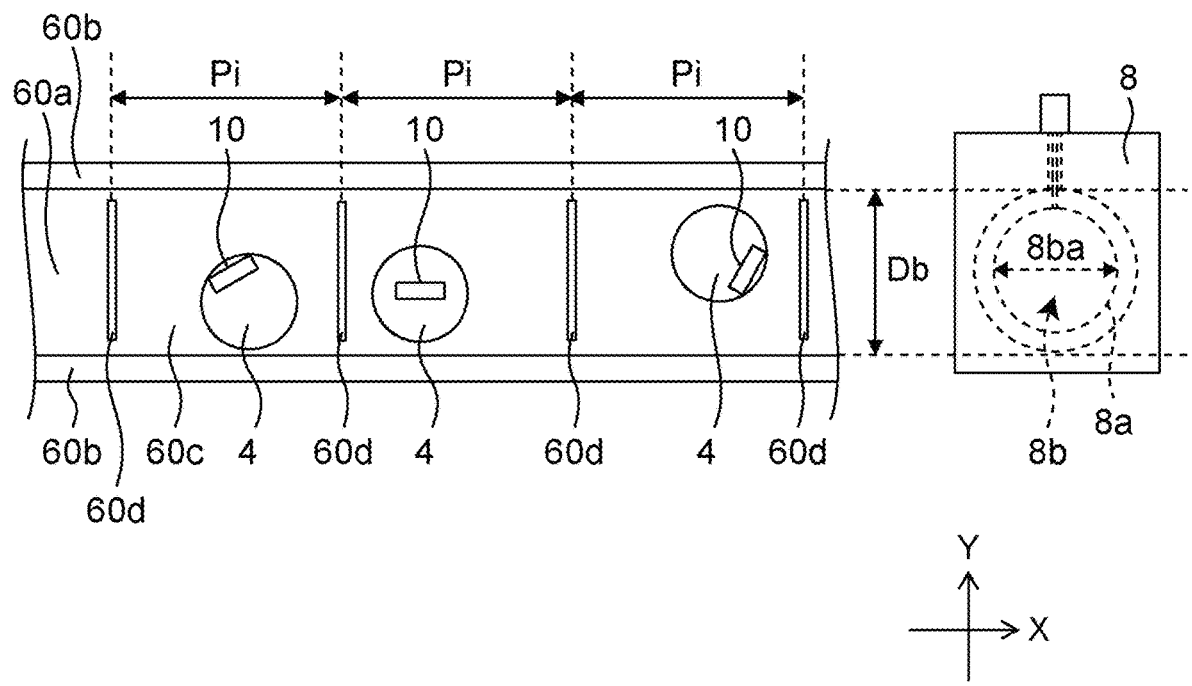
FIG. 7 is an explanatory diagram showing a positional relationship between the article and the reader/writer.

FIG. 7 is an explanatory diagram showing a positional relationship between the articles 4 and the reader/writer 8 in planar view. The reader/writer 8 is disposed such that the magnetic field antenna 8a is located between the guide parts 60b (e.g., rails) of the belt conveyor 60. A distance Db between the two guide parts 60b in a direction (i.e., the Y direction) orthogonal to the conveying direction (i.e., the X direction) of the RFID tag 10 is equal to or less than the diameter of the magnetic field antenna 8a. As a result, even if the RFID tag 10 stored in the article 4 is displaced between the guide parts 60b, the RFID tag 10 can be conveyed through a vertical space over the opening plane 8ba of the magnetic field antenna 8a. In other words, as shown in FIG. 1, the article 4 is conveyed such that the opening plane 8ba of the magnetic field antenna 8a overlaps with the RFID tag 10 in planar view. The displacement of the RFID tag 10 can include rotation, movement in a plane (X-Y plane) parallel to the belt conveyor 60, and movement in the height direction.

The articles 4 are conveyed within a predetermined interval Pi. As a result, the RFID tags 10 stored in the articles 4 sequentially pass through the communicable region Ar of the reader/writer 8, so that failure in communication of the tag information can be reduced.

Figure 8:
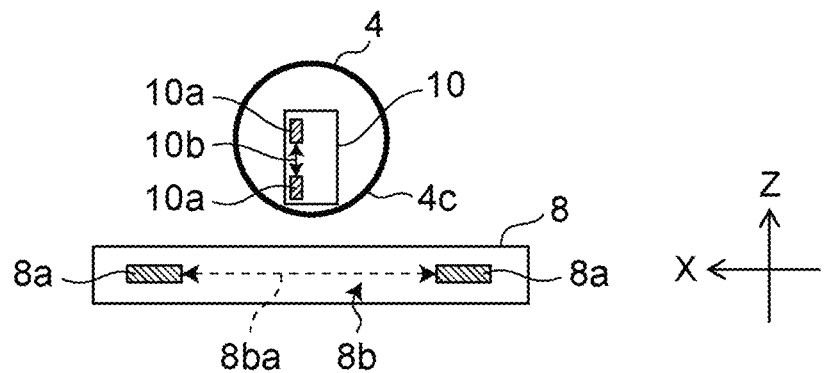
FIG. 8 is an explanatory diagram showing a state of the RFID tag inside the article.
Figure 9:
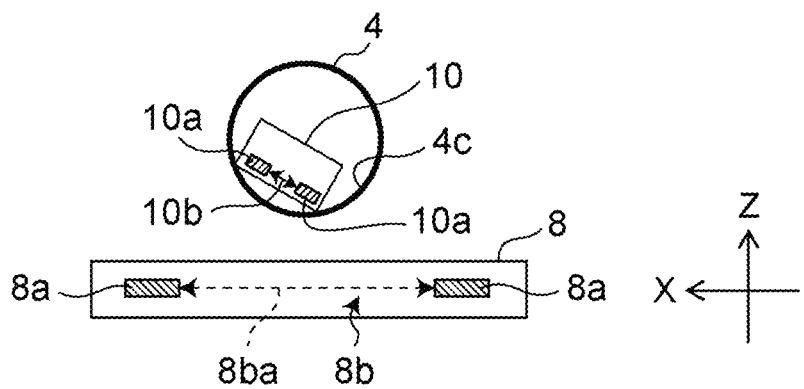
FIG. 9 is an explanatory diagram showing a state of the RFID tag in the article.
Figure 10:
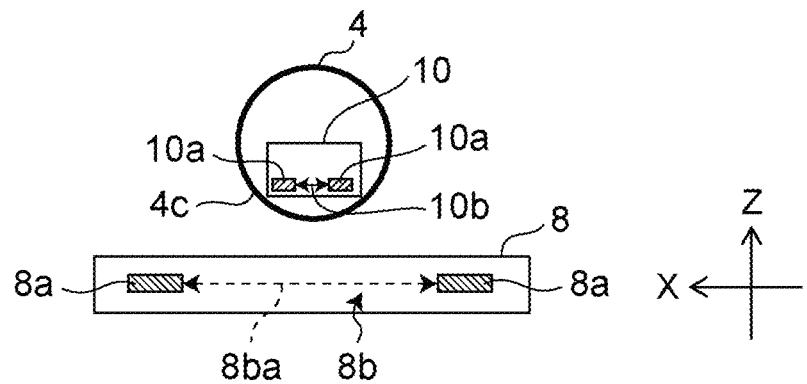
FIG. 10 is an explanatory diagram showing a state of the RFID tag inside the article.

FIGS. 8 to 10 are explanatory diagrams each showing a posture state of the RFID tag 10 in the article 4. In FIGS. 8 to 10, the RFID tag 10 is shown larger for easy understanding, and therefore, a size ratio of the article 4, the RFID tag 10, and the reader/writer 8 shown in each of the figures is not the actual ratio. The RFID tag 10 is housed on the curved surface 4c of the article 4 without being fixed to the article 4. As a result, when the article 4 is placed on the belt conveyor 60, the RFID tag 10 is in various positional states and tilted postures in the article 4.

For example, in FIG. 8, the RFID tag 10 passes over the reader/writer 8 with an opening plane 10b of the magnetic field antenna 10a of the RFID tag 10 and the opening plane 8ba of the magnetic field antenna 8a of the reader/writer 8 orthogonal to each other.

In FIG. 9, the RFID tag 10 passes over the reader/writer 8 with the opening plane 10b of the magnetic field antenna 10a of the RFID tag 10 and the opening plane 8ba of the magnetic field antenna 8a of the reader/writer 8 intersecting with each other.

In FIG. 10, the RFID tag 10 passes over the reader/writer 8 with the opening plane 10b of the magnetic field antenna 10a of the RFID tag 10 and the opening plane 8ba of the magnetic field antenna 8a of the reader/writer 8 being parallel to each other.

As described above, in the article 4, the RFID tag 10 is stored in the article 4 without being fixed. In the article 4 and the article 4A, when the RFID tag 10 is stored, the RFID tag 10 is stored in the article 4 in a random orientation without a set position. For purposes of this disclosure, the term "random" is considered to mean that a relationship is not determined (or predetermined) between the normal direction of the opening plane 10b of the magnetic field antenna 10a of the RFID tag 10 and the normal direction of the opening plane 8ba of the magnetic field antenna 8a of the reader/writer 8. In other words, "random" is considered to mean that the opening plane 10b of the magnetic field antenna 10a of the RFID tag 10 forms any angle with the opening plane 8ba of the magnetic field antenna 8a of the reader/writer 8. Additionally, even during conveyance, the RFID tag 10 can rotate or move in a direction intersecting with the conveying direction in the article 4 due to vibration of the belt conveyor 60.

<RFID Tag>

Figure 11:
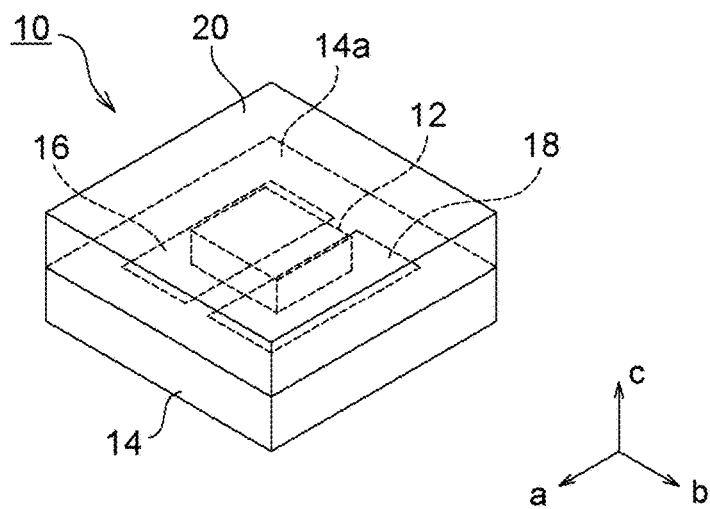
FIG. 11 is a perspective view of the RFID tag.
Figure 12:
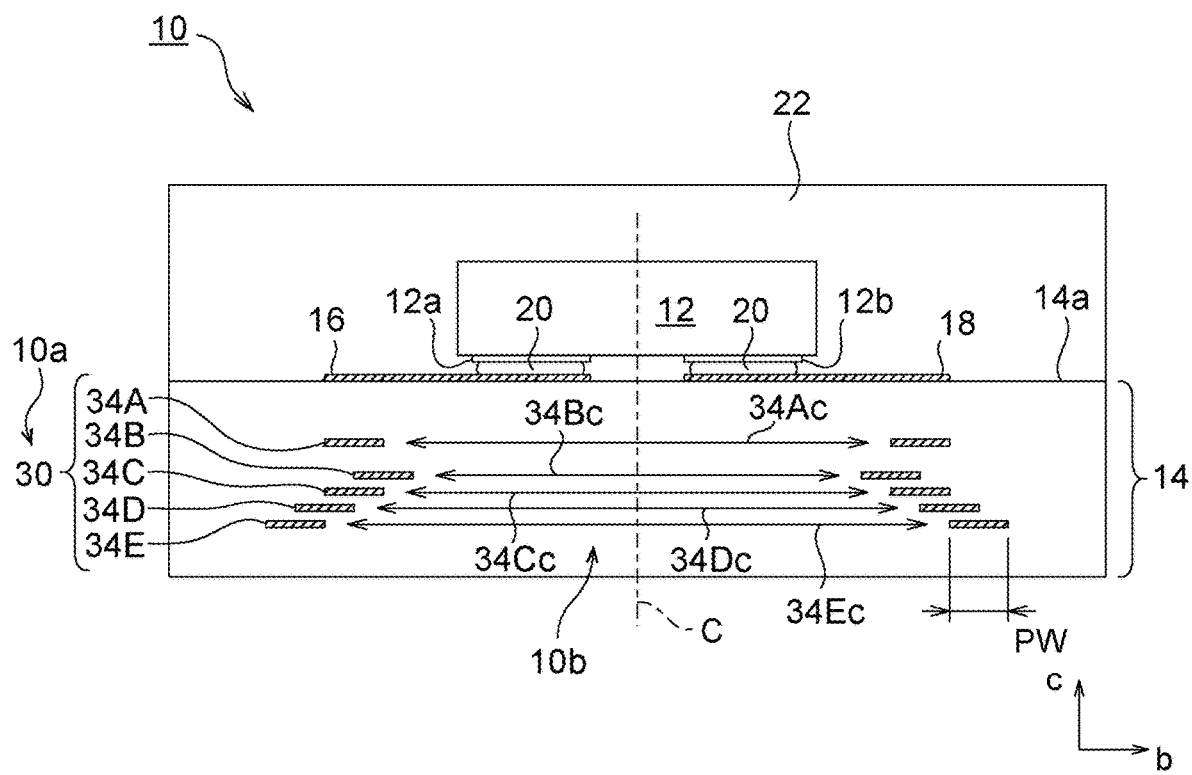
FIG. 12 is a cross-sectional view of the RFID tag.
Figure 13:
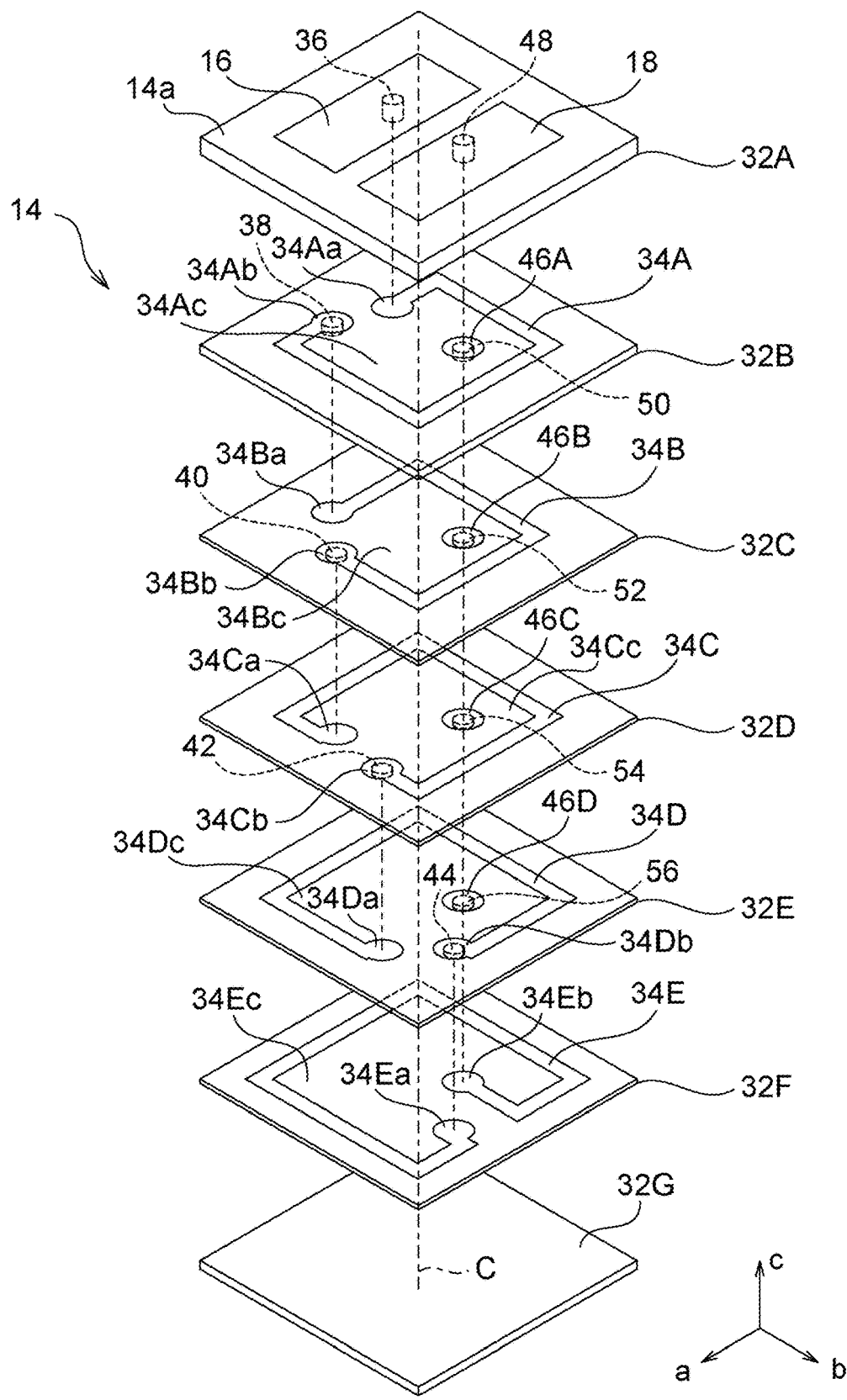
FIG. 13 is an exploded perspective view of a multilayer substrate in the RFID tag.

A configuration of the RFID tag 10 will be described with reference to FIGS. 11 to 13. FIG. 11 is a perspective view of the RFID tag 10. FIG. 12 is a cross-sectional view of the RFID tag 10. FIG. 13 is an exploded perspective view of a multilayer substrate in the RFID tag 10. In the drawings, an a-b-c coordinate system is for facilitating understanding of the invention and does not limit the invention. A c-axis direction indicates a thickness direction of the RFID tag. The a, b, and c directions are orthogonal to each other.

As shown in FIGS. 11 and 12, the RFID tag 10 is a rectangular parallelepiped ultra-small RFID tag having a size in the X-axis direction and the Y-axis direction of 2 mm or less (e.g., 1.2 mm) and is configured as an RFIC package with an antenna having an RFIC (Radio-Frequency Integrated Circuit) chip 12 and a multilayer substrate 14.

The RFIC chip 12 is a component in which elements and circuits are disposed on a semiconductor substrate and is configured to wirelessly communicate with the external reader/writer 8. In the case of the first embodiment, the RFIC chip 12 is configured to communicate at a communication frequency in the UHF band (e.g., about 920 MHz).

In the case of the first embodiment, the multilayer substrate 14 includes a principal surface 14a on which the RFIC chip 12 is mounted. The principal surface 14a is provided with a first land 16 for electrically connecting to a first input/output terminal 12a of the RFIC chip 12 and a second land 18 for electrically connecting to a second input/output terminal 12b. The first and second lands 16, 18 are conductor patterns formed on the principal surface 14a and made of a conductor material such as copper, for example. Electrical connection between the first input/output terminal 12a and the first land 16 and electrical connection between the second input/output terminal 12b and the second land 18 are made via a solder member 20, for example.

In the first exemplary embodiment, to cover and protect the RFIC chip 12 mounted on the principal surface 14a of the multilayer substrate 14, a protective layer 22 (see FIG. 12) fabricated from a resin material is formed on the principal surface 14a of the multilayer substrate 14.

As shown in FIG. 12, the multilayer substrate 14 is provided with an antenna coil 30 (e.g., helical coil-shaped antenna) as the magnetic field antenna 10a. Specifically, the antenna coil 30 is disposed in the multilayer substrate 14 such that a winding axis C thereof intersects with the principal surface 14a of the multilayer substrate 14 (orthogonally, in the case of this exemplary embodiment). The winding axis C of the antenna coil 30 also intersects with the RFIC chip 12. Details of the antenna coil 30 will be described with reference to FIG. 13, which is an exploded perspective view of the multilayer substrate 14.

As shown in FIG. 13, the multilayer substrate 14 is a laminated body formed by laminating multiple base material layers 32A to 32G fabricated from a dielectric material or a non-magnetic material, for example, fabricated from a resin material or a ceramic material. The antenna coil 30 includes loop patterns 34A to 34E formed on these base material layers. The loop patterns 34A to 34E have respective loop openings 34Ac to 34Ec. The loop openings 34Ac to 34Ec form the opening plane 10b of the magnetic field antenna 10a. The antenna coil 30 also includes interlayer connection conductors 36 to 56 penetrating these base material layers.

In the first exemplary embodiment, the multiple loop patterns of the antenna coil 30 are formed on the five base material layers 32B to 32F of the multiple base material layers 32A to 32G except the base material layers 32A, 32G respectively arranged at both ends in the lamination direction (c-axis direction) of the multilayer substrate 14.

The base material layer 32A without the loop pattern formed thereon includes a surface configured as the principal surface 14a of the multilayer substrate 14, and the first and second lands 16 and 18 are formed on the surface. In the first exemplary embodiment, the base material layer 32A has a thickness (e.g., a thickness of 100 pm) greater than the thicknesses of the remaining base material layers 32B to 32G.

Specifically, the loop pattern 34A of the antenna coil 30 is arranged closest to the principal surface 14a of the multilayer substrate 14 (i.e., the RFIC chip 12) as compared to the other loop patterns. The loop pattern 34A is a conductor pattern formed into a substantially annular shape to surround the winding axis C on a surface of the base material layer 32B on the principal surface 14a side of the multilayer substrate 14 and fabricated from a conductive material such as copper, for example.

One terminal 34Aa of the loop pattern 34A is electrically connected to the first land 16 on the base material layer 32A through the interlayer connection conductor 36 such as a via-hole conductor penetrating the base material layer 32A.

The loop pattern 34B is a conductor pattern formed into a substantially annular shape to surround the winding axis C on a surface of the base material layer 32C on the principal surface 14a side of the multilayer substrate 14 and fabricated from a conductive material such as copper, for example.

One terminal 34Ba of the loop pattern 34B is electrically connected to the other terminal 34Ab of the loop pattern 34A on the base material layer 32B through the interlayer connection conductor 38 penetrating the base material layer 32B.

The loop pattern 34C is a conductor pattern formed into a substantially annular shape to surround the winding axis C on a surface of the base material layer 32D on the principal surface 14a side of the multilayer substrate 14 and fabricated from a conductive material such as copper, for example.

One terminal 34Ca of the loop pattern 34C is electrically connected to the other terminal 34Bb of the loop pattern 34B on the base material layer 32C through the interlayer connection conductor 40 penetrating the base material layer 32C.

The loop pattern 34D is a conductor pattern formed into a substantially annular shape to surround the winding axis C on a surface of the base material layer 32E on the principal surface 14a side of the multilayer substrate 14 and fabricated from a conductive material such as copper, for example.

One terminal 34Da of the loop pattern 34D is electrically connected to the other terminal 34Cb of the loop pattern 34C on the base material layer 32D through the interlayer connection conductor 42 penetrating the base material layer 32D.

The loop pattern 34E is arranged farthest from the principal surface 14a of the multilayer substrate 14 (i.e., the RFIC chip 12) relative to the other loop patterns. The loop pattern 34E is a conductor pattern formed into a substantially annular shape to surround the winding axis C on a surface of the base material layer 32F on the principal surface 14a side of the multilayer substrate 14 and fabricated from a conductive material such as copper, for example.

One terminal 34Ea of the loop pattern 34E is electrically connected to the other terminal 34Db of the loop pattern 34D on the base material layer 32E through the interlayer connection conductor 44 penetrating the base material layer 32E. On the other hand, the other terminal 34Eb is electrically connected to the second land 18 on the base material layer 32A. Electrical connection between the terminal 34Eb and the second land 18 is made through lands 46A to 46D formed on the base material layers 32B to 32E and the interlayer connection conductors 48 to 56 penetrating the base material layers 32A to 32E.

As shown in FIG. 12, in the case of the first embodiment, each of the loop patterns 34A to 34E of the antenna coil 30 is a rectangular pattern having substantially the same pattern width PW.

With such a configuration of the exemplary embodiment, the antenna coil 30 is formed into a helical shape, is disposed in the multilayer substrate 14, and is electrically connected to the RFIC chip 12 through the first and second lands 16, 18.

<Tag Information Management>

Figure 14:
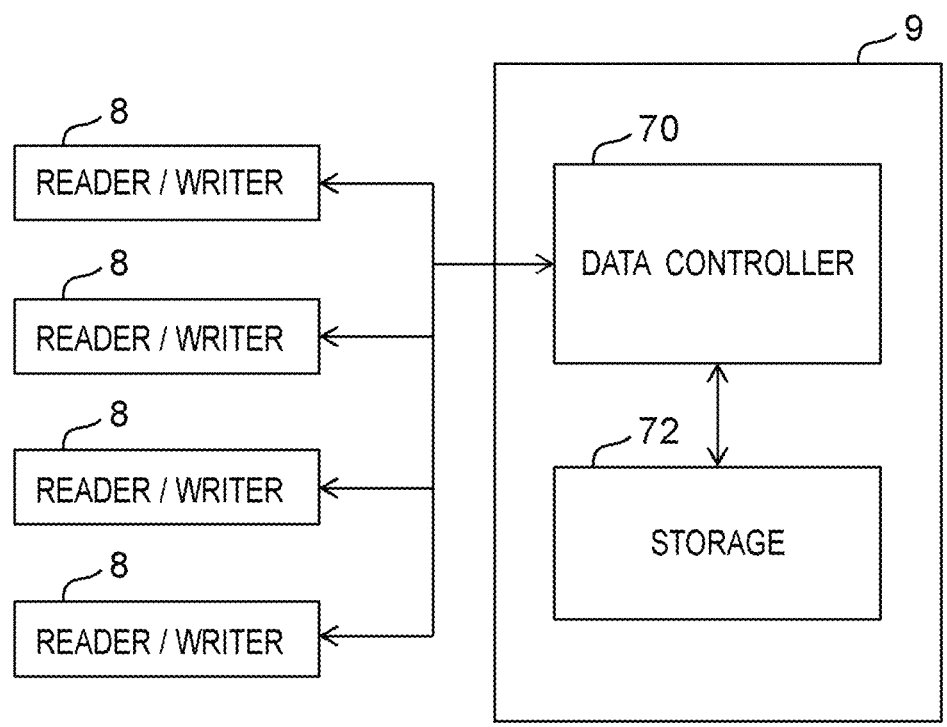
FIG. 14 is a block diagram of the RFID system of the first exemplary embodiment.

Management of tag information will be described with reference to FIG. 14. FIG. 14 is a block diagram of the RFID system 2 of the first exemplary embodiment. The tag information read from the RFID tags 10 by the reader/writers 8 is sent to a data controller 70, and pieces of the tag information of the respective RFID tags 10 are recognized. The respective pieces of the read tag information are stored in a storage 72. The personal computer 9 includes the data controller 70 and the storage 72. For example, the data controller 70 can include any one of a CPU, a microprocessor, and an FPGA (Field Programmable Gate Array), or a combination thereof, and is configured to execute software for controlling the wireless communication processes. For example, the storage 72 is made up of any one of a hard disk, a memory, and an SSD (Solid State Drive), or a combination thereof.

When new information is written in the RFID tag 10 as the tag information, the tag information for writing stored in the storage 72 is sent to the reader/writers 8 by the data controller 70. Each of the reader/writers 8 writes the new tag information in the RFID tag 10 stored in the conveyed article 4.

The relationship between the RFID tag 10 in each posture state and the magnetic flux Br will be described with reference to FIGS. 15 to 20. FIGS. 15 to 20 are explanatory diagrams showing the posture state of each of the RFID tags 10 passing through the magnetic flux Br of the reader/writer 8. In FIGS. 15 to 20, the RFID tag 10 is shown larger for easy understanding, and therefore, a size ratio of the RFID tag 10 and the magnetic field antenna 8a shown in each of the figures is not the actual ratio.

Figure 15:
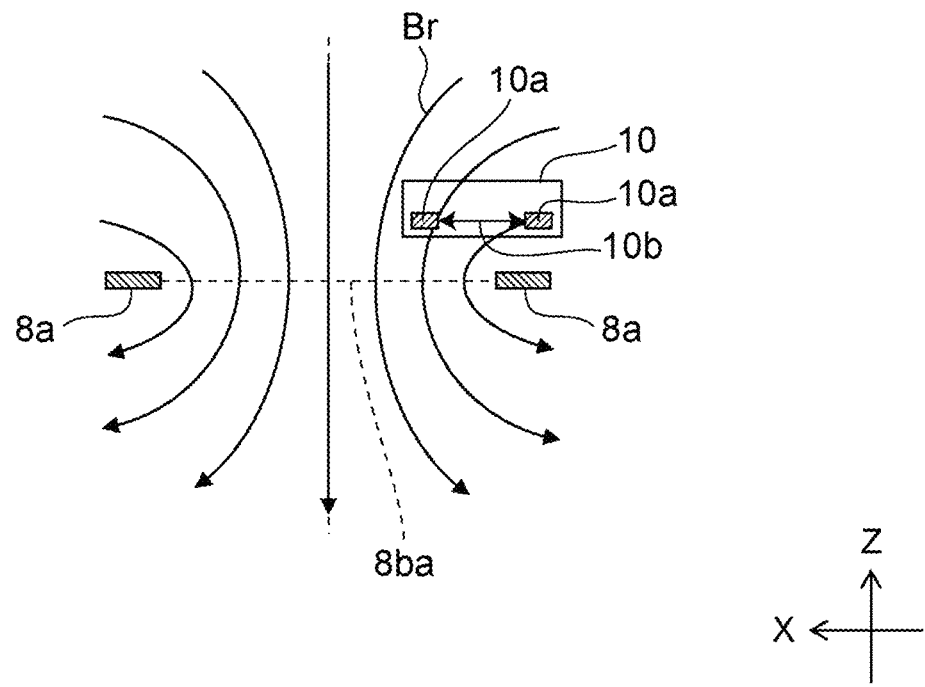
FIG. 15 is an explanatory diagram showing the RFID tag passing through the magnetic flux of the reader/writer.
Figure 16:
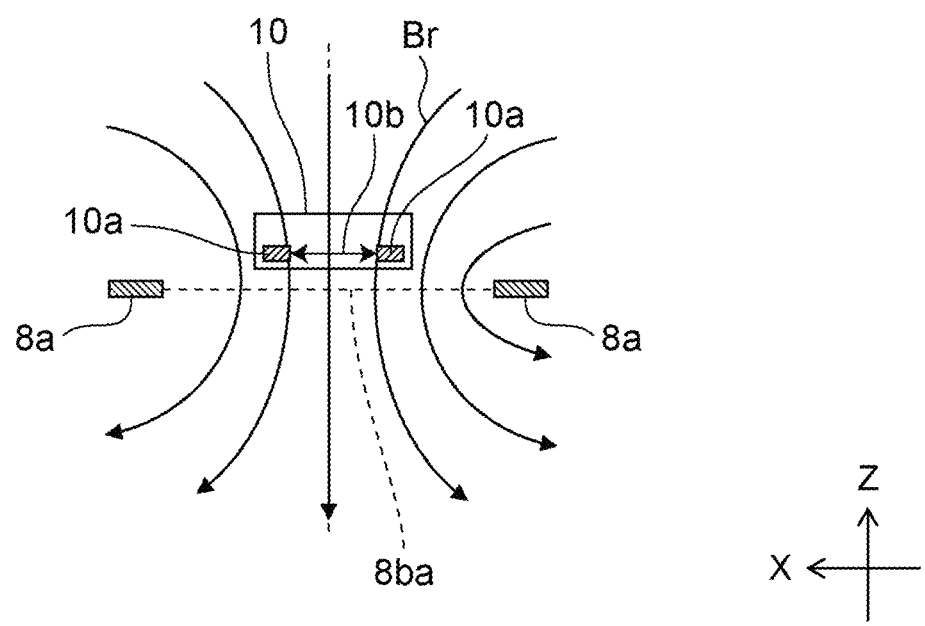
FIG. 16 is an explanatory diagram showing the RFID tag passing through the magnetic flux of the reader/writer.

In the exemplary embodiments of FIGS. 15 and 16, the article 4 is conveyed with the opening plane 8ba of the magnetic field antenna 8a of the reader/writer 8 and the opening plane 10b of the magnetic field antenna 10a of the RFID tag 10 being parallel to each other. Although the positional state of the RFID tag 10 shown in FIG. 15 is inferior in communication characteristics to the positional state of the RFID tag 10 shown in FIG. 16, the state changes from FIG. 15 to FIG. 16 as the article is conveyed. Therefore, even when the article 4 is conveyed with the opening plane 8ba of the magnetic field antenna 8a of the reader/writer 8 and the opening plane 10b of the magnetic field antenna 10a of the RFID tag 10 being parallel to each other, favorable communication can be performed between the reader/writer 8 and the RFID tag 10.

Figure 17:
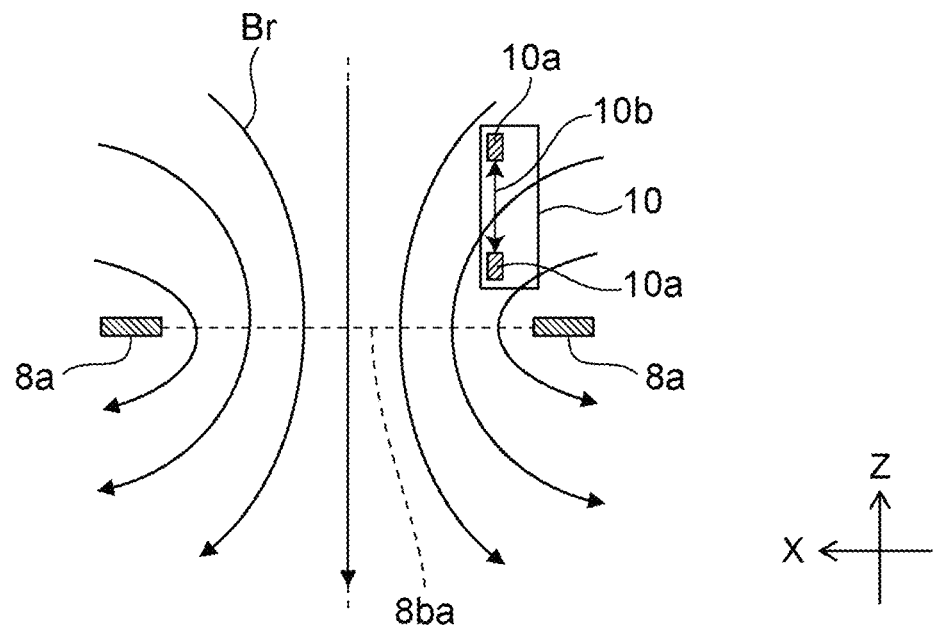
FIG. 17 is an explanatory diagram showing the RFID tag passing through the magnetic flux of the reader/writer.
Figure 18:
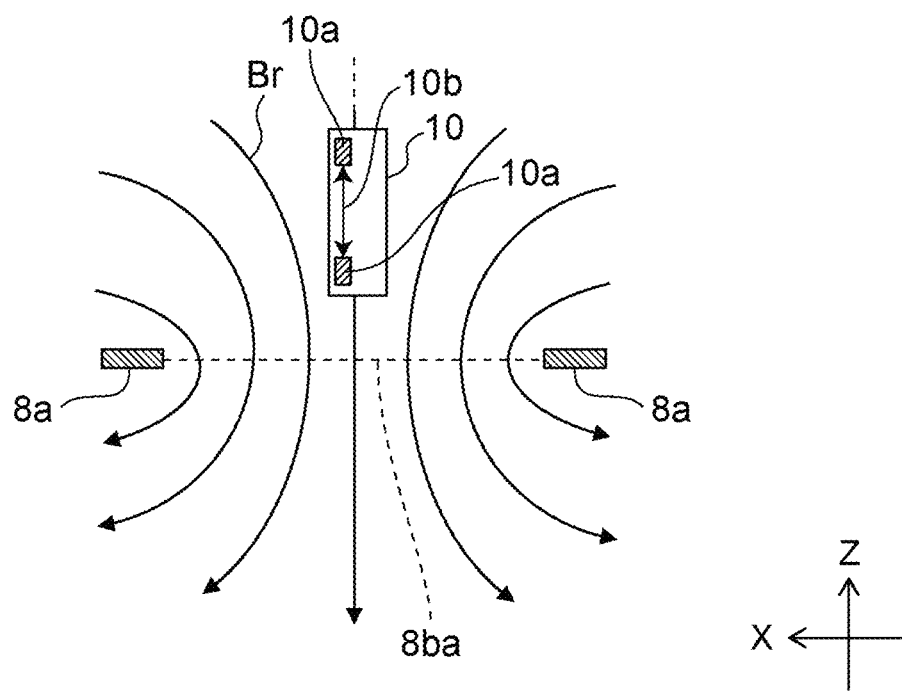
FIG. 18 is an explanatory diagram showing the RFID tag passing through the magnetic flux of the reader/writer.

In the exemplary implementations shown in FIGS. 17 and 18, the article 4 is conveyed with the opening plane 8ba of the magnetic field antenna 8a of the reader/writer 8 and the opening plane 10b of the magnetic field antenna 10a of the RFID tag 10 being orthogonal to each other. The positional state of the RFID tag 10 shown in FIG. 18 is a state in which almost no magnetic flux passes through the opening plane 10b of the magnetic field antenna 10a, so that communication cannot be performed between the reader/writer 8 and the RFID tag 10. However, in the state of FIG. 17, which is the state before the positional state shown in FIG. 18, a magnetic flux passes through the opening plane 10b of the magnetic field antenna 10a of the RFID tag 10. Additionally, the state shown in FIG. 18 is followed by the state left-right symmetrical to that of FIG. 17, so that a magnetic flux passes through the opening plane 10b of the magnetic field antenna 10a of the RFID tag 10. Therefore, even when the article 4 is conveyed with the opening plane 8ba of the magnetic field antenna 8a of the reader/writer 8 and the opening plane 10b of the magnetic field antenna 10a of the RFID tag 10 being perpendicular to each other, favorable communication can be performed between the reader/writer 8 and the RFID tag 10.

Figure 19:
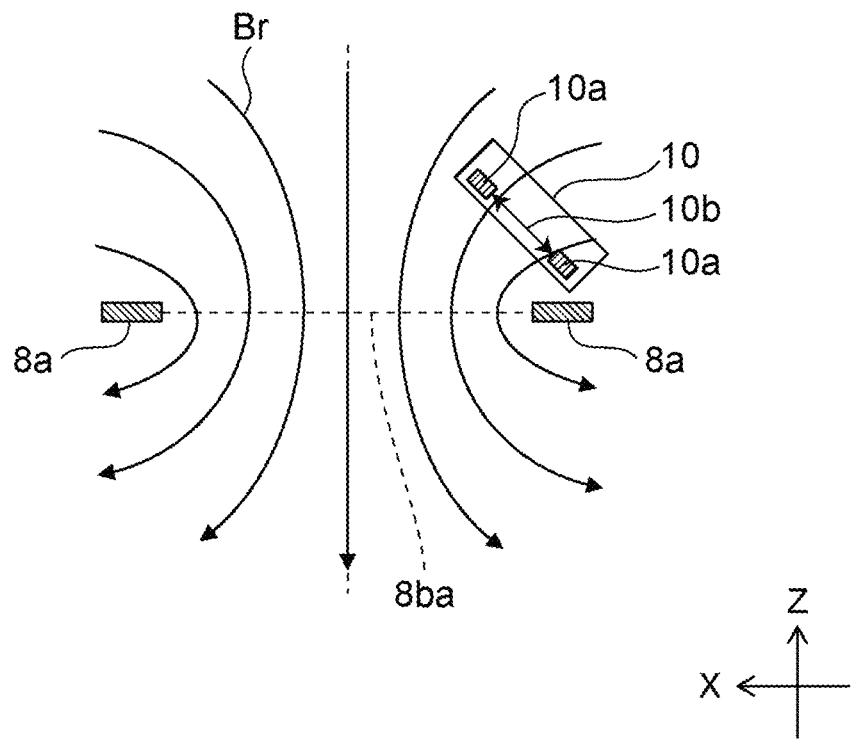
FIG. 19 is an explanatory diagram showing the RFID tag passing through the magnetic flux of the reader/writer.
Figure 20:
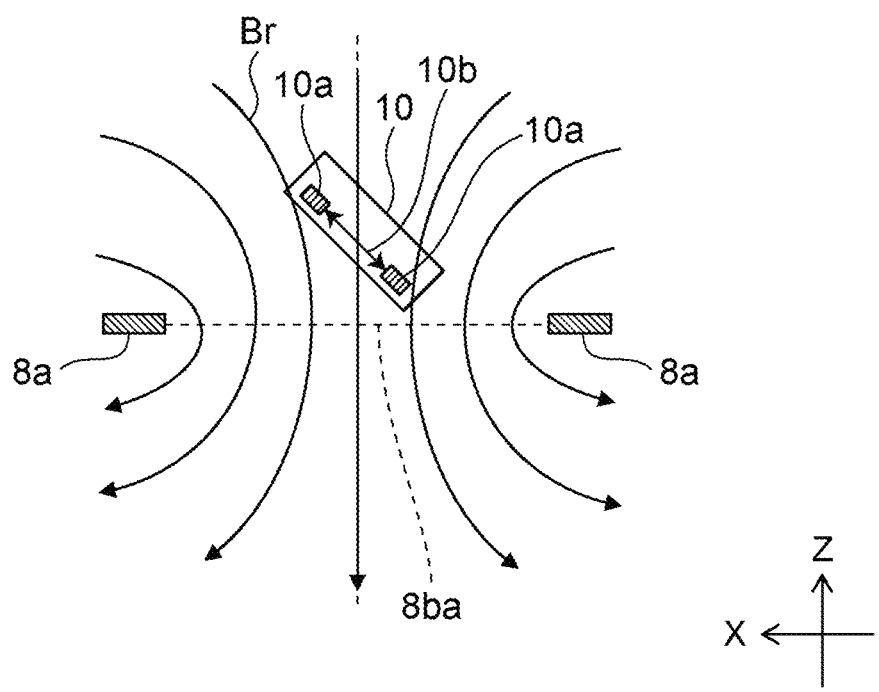
FIG. 20 is an explanatory diagram showing the RFID tag passing through the magnetic flux of the reader/writer.

In the exemplary implementations shown in FIGS. 19 and 20, the article 4 is conveyed with the opening plane 8ba of the magnetic field antenna 8a of the reader/writer 8 and the opening plane 10b of the magnetic field antenna 10a of the RFID tag 10 intersecting each other. Although the positional state of the RFID tag 10 shown in FIG. 19 is inferior in communication characteristics to the positional state of the RFID tag 10 shown in FIG. 20, the state changes from FIG. 19 to FIG. 20 as the article is conveyed. Therefore, even when the article 4 is conveyed with the opening plane 8ba of the magnetic field antenna 8a of the reader/writer 8 and the opening plane 10b of the magnetic field antenna 10a of the RFID tag 10 intersecting each other, favorable communication can be performed between the reader/writer 8 and the RFID tag 10.

As described above, the RFID system 2 includes the RFID tag 10 having the magnetic field antenna 10a configured as the first magnetic field antenna, and the article 4 housing the RFID tag 10 in a random direction. The RFID system 2 further includes the belt conveyor 60 as a conveying path conveying the article 4, and the reader/writer 8 having the loop-shaped magnetic field antenna 8a communicating with the magnetic field antenna 10a through a magnetic field coupling and disposed along the belt conveyor 60. Additionally, while the belt conveyor 60 conveys the RFID tag 10 such that the opening plane 8ba of the magnetic field antenna 8a and the RFID tag 10 face each other, the magnetic field antenna 8a emits a magnetic flux. According to the exemplary aspect, the distance between the RFID tag 10 and the magnetic field antenna 8a in the normal direction of the magnetic field antenna 8a is smaller than the opening diameter Lr that is the inner diameter of the magnetic field antenna 8a. With only this configuration, since the distance between the RFID tag 10 and the magnetic field antenna 8a is smaller than the opening diameter Lr of the magnetic field antenna 8a, the communication distance can be ensured between the magnetic field antenna 10a of the RFID tag 10 and the magnetic field antenna 8a of the reader/writer 8.

While the belt conveyor 60 conveys the RFID tag 10 such that the opening plane 8ba of the magnetic field antenna 8a of the reader/writer 8 and the RFID tag 10 face each other, the magnetic field antenna 8a radiates a magnetic flux. In other words, communication is performed while the relative positional relationship is being changed between the magnetic field antenna 8a and the RFID tag 10. Even if the RFID tag 10 is temporarily in a positional relationship making it difficult to communicate with the reader/writer 8, a change to a communicable positional relationship occurs as the RFID tag is conveyed by the belt conveyor 60. Therefore, even if the RFID tag 10 is housed in the article 4 in a random direction, the communication is performed while the positional relationship with the magnetic field antenna 8a is being changed, so that the reader/writer 8 and the RFID tag 10 can wirelessly communicate at a communicable position. While the article 4 is being conveyed, the magnetic flux of the magnetic field antenna 8a is incident on the RFID tag 10 at various angles, so that the communication becomes easier. As described above, since the RFID tag 10 may be housed in the article 4 in a random direction, a labor for attaching the RFID tag 10 to the article 4 can be reduced.

The RFID tag 10 is housed in a displaceable manner in the article 4. Therefore, it is not necessary to fix the RFID tag 10 to the article 4, so that a complexity of fixing the RFID tag 10 to the article 4 can be eliminated, particularly when the small-sized RFID tag 10 is used. As such, the RFID tag 10 can be rotatably housed in the article 4.

The belt conveyor 60 has the guide part 60b (e.g., a pair of rails) regulating displacement of the RFID tag 10 in a direction intersecting with a conveying direction. As a result, even if the RFID tag 10 is housed in the article 4 displaceable in the direction intersecting with the conveying direction, the RFID tag 10 can be displaced within a range of the magnetic field antenna 8a.

A displacement range of the RFID tag 10 is within the opening plane 8ba of the magnetic field antenna 8a in planar view. This can improve a density of the magnetic flux Br generated from the magnetic field antenna 8a and passing through the RFID tag 10.

The opening plane 10b of the magnetic field antenna 10a of the RFID tag 10 is orthogonal to the opening plane 8ba of the magnetic field antenna 8a of the reader/writer 8. Conventionally, the RFID tag 10 and the reader/writer 8 cannot communicate in such a positional relationship. However, since the RFID tag 10 passes through the region Ar while being conveyed, the RFID tag 10 and the reader/writer 8 can communicate with each other.

The article 4 has the curved surface 4c, and the curved surface 4c of the article 4 bulges out toward the belt conveyor 60. Even though the article 4 has the curved surface 4c as described above, the small RFID tag 10 can be housed in the article 4 since it is not necessary to fix the RFID tag 10. Additionally, favorable communication can be performed with the unfixed RFID tag 10.

The articles 4 are conveyed at predetermined intervals. As a result, the RFID tags 10 stored in the articles 4 sequentially pass through the communication region of the reader/writer 8, so that failure in communication of the tag information can be reduced.

According to the exemplary aspect, the multiple reader/writers 8 are arranged along the conveying direction. Since the multiple reader/writers 8 are arranged along the conveying direction, communication can be performed multiple times with the RFID tag 10 housed in the conveyed article 4. That is, the multiple reader/writers 8 communicate with all the RFID tags 10 passing through the respective communicable regions Ar. Therefore, the number of times of communication is the same as the number of the arranged reader/writers 8 for the sequentially conveyed RFID tags 10, so that failure in communication can be reduced or eliminated.

Second Exemplary Embodiment

Figure 21:
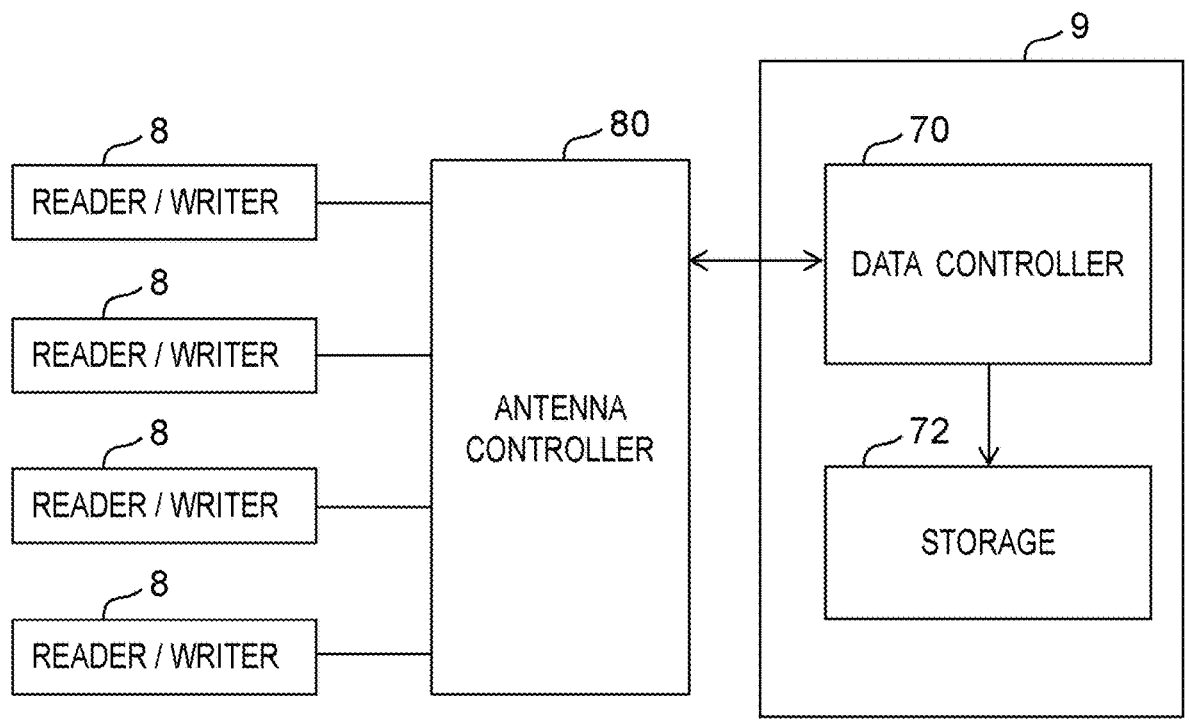
FIG. 21 is a block diagram of an RFID system of a second exemplary embodiment.

An RFID system of a second embodiment of the present invention will be described with reference to FIG. 21. FIG. 21 is a diagram showing a configuration of the RFID system of the second embodiment.

The RFID system of the second embodiment has a configuration in which an antenna controller 80 is added to the RFID system 2 of the first embodiment. The RFID system 2 of the second embodiment has the same configuration as the RFID system 2 of the first embodiment except the matters described below.

In particular, the antenna controller 80 is provided and configured to control communication of the multiple reader/writers 8. The multiple reader/writers 8 simultaneously communicating with the multiple RFID tags 10 may interfere with each other. Therefore, the antenna controller 80 sequentially supplies a current to the reader/writers 8 to provide sequence control such that the reader/writers 8 sequentially perform communication. The sequence control may be provided such that only one of the multiple reader/writers 8 sequentially emits a magnetic flux, or that the reader/writers 8 adjacent to each other do not simultaneously emit a magnetic flux. According to an exemplary aspect, the antenna controller 80 is made up of any one of a CPU, a microprocessor, and an FPGA (Field Programmable Gate Array) connected to multiple antenna ports, or a combination thereof.

As described above, according to the second embodiment, the RFID system 2 includes the antenna controller 80 controlling the multiple reader/writers 8, and the antenna controller 80 provides control such that a magnetic flux is emitted with a time lag from the multiple reader/writers adjacent to each other. As a result, the multiple reader/writers 8 can be prevented from simultaneously communicating with the multiple RFID tags 10 and can be prevented from interfering with each other during communication.

In general, it is noted that the present invention is not limited to the exemplary embodiments and can be implemented in modifications as follows.

In the embodiments, the articles 4, 4A and the RFID tag 10 have the displaceable configuration. However, the present invention is not limited thereto. If the belt conveyor 60 conveys the RFID tag 10 such that the opening plane 8ba of the magnetic field antenna 8a of the reader/writer 8 faces the RFID tag 10, only the RFID tag 10 may be displaceable.

In the exemplary embodiments, the reader/writers 8 are arranged under the belt conveyor 60 as described above. However, the present invention is not limited to this configuration. For example, the reader/writers 8 can be arranged above the belt conveyor 60 in an alternative aspect.

Furthermore, in the exemplary embodiments, the multiple reader/writers 8 are arranged parallel to the conveying surface of the belt conveyor 60. However, the present invention is not limited thereto. For example, the reader/writers 8 may be arranged to have respective different angles relative to the conveying surface of the belt conveyor 60. As a result, the multiple reader/writers 8 face the RFID tag 10 of the conveyed article 4 at different angles, so that the communication accuracy of the tag information can further be improved.

In the exemplary embodiments, the articles 4, 4A may be molded products that are resin molds. In this case, the RFID tag 10 can be inserted into a mold product in a random posture while resin is not yet cured. As a result, the RFID tag 10 can easily be mounted on the resin mold product. The resin mold product is not limited to a rotating body and may be a rectangular parallelepiped.

EXPLANATIONS OF LETTERS OR NUMERALS

2 RFID system
4 article
4a case
4c curved surface
4A article

4Aa filler
6 conveying device
8 reader/writer
8a magnetic field antenna
8b opening
8ba opening plane
10 RFID tag
10a magnetic field antenna
10b opening plane
12 RFIC chip
12a first input/output terminal
12b input/output terminal
14 multilayer substrate
14a principal surface
16 first land
18 second land
20 solder member
30 antenna coil
32A to 32G base material layer
34A to 34E loop pattern
34Ac to 34Ec loop opening
36 to 56 interlayer connection conductor
46A to 46D land
60 belt conveyor
60a belt part
60b guide part
60c surface
60d projecting part
62 toy
70 data controller
72 storage
80 antenna controller
Ar region

The invention claimed is:

1. An RFID system comprising:
an RFID tag including a first magnetic field antenna;
an article housing the RFID tag in a random direction;
a conveying path configured to convey the article in a conveying direction; and
a reader/writer including a second magnetic field antenna configured to communicate with the first magnetic field antenna through a magnetic field coupling and disposed along the conveying path,
wherein the second magnetic field antenna emits a magnetic flux while the conveying path conveys the RFID tag in the conveying direction with the RFID tag facing an opening plane of the second magnetic field antenna, and
wherein the second magnetic field antenna comprises an opening diameter that is larger than a distance between the RFID tag and the second magnetic field antenna in a normal direction of the second magnetic field antenna when the RFID tag is facing the opening plane of the second magnetic field antenna.

2. The RFID system according to claim 1, wherein the article houses the RFID tag in a displaceable manner.

3. The RFID system according to claim 2, wherein the RFID tag is rotatably housed in the article.

4. The RFID system according to claim 2, wherein the conveying path includes at least one guide configured to regulate displacement of the RFID tag in a direction that intersects the conveying direction.

5. The RFID system according to claim 2, wherein the RFID tag includes a displacement range that is within the opening plane of the second magnetic field antenna in a planar view thereof.

6. The RFID system according to claim 1, wherein the first magnetic field antenna of the RFID tag comprises an opening plane that is orthogonal to the opening plane of the second magnetic field antenna of the reader/writer when the conveying path conveys the article in the conveying direction.

7. The RFID system according to claim 1, wherein the article has a curved outer surface that bulges out toward the conveying path.

8. The RFID system according to claim 1, wherein the article is one of a plurality of articles conveyed at predetermined intervals in the conveying direction.

9. The RFID system according to claim 1, wherein the reader/writer is one of a plurality of reader/writers arranged along the conveying direction, with each of the plurality of reader/writers configured to communicate with the first magnetic field antenna through magnetic field coupling.

10. The RFID system according to claim 9, further comprising an antenna controller configured to control the plurality of reader/writers.

11. The RFID system according to claim 10, wherein the antenna controller is configured to provide control such that each of the plurality of reader/writers is configured to emit a magnetic flux with a time lag relative to an adjacent reader/writer of the plurality of reader/writers.

12. The RFID system according to claim 1, wherein the article houses the RFID tag in the random direction that is not a set relationship between a normal direction of an opening plane of the first magnetic field antenna of the RFID tag and the normal direction of the opening plane of the second magnetic field antenna of the reader/writer.

13. The RFID system according to claim 12, wherein the article houses the RFID tag in the random direction such that the opening plane of the first magnetic field antenna of the RFID tag forms any angle with the opening plane of the second magnetic field antenna of the reader/writer.

14. The RFID system according to claim 1, wherein the RFID tag comprises a rectangular parallelepiped shape that is configured as an RFIC package with an antenna having an RFIC chip and a multilayer substrate.

15. The RFID system according to claim 14, wherein the RFIC chip is disposed on a semiconductor substrate and is configured to wirelessly communicate with the reader/writer.

16. The RFID system according to claim 15, wherein the multilayer substrate comprises an antenna coil that is configured as the first magnetic field antenna.

17. An RFID system comprising:
an RFID tag housed in an article and including a first magnetic field antenna;
a conveying path configured to convey the article in a conveying direction; and
a reader/writer disposed along the conveying path and including a second magnetic field antenna configured to communicate with the first magnetic field antenna through magnetic field coupling by emitting a magnetic flux while the conveying path conveys the RFID tag in the conveying direction, and
wherein the second magnetic field antenna comprises an opening diameter that is larger than a distance between the RFID tag and the second magnetic field antenna in a direction normal to the second magnetic field antenna when the RFID is facing an opening plane of the second magnetic field antenna while the conveying path is conveying the RFID tag in the conveying direction.

18. The RFID system according to claim 17, wherein the article houses the RFID tag in a random direction that is not a set relationship between a normal direction of an opening plane of the first magnetic field antenna of the RFID tag and the normal direction of the opening plane of the second magnetic field antenna of the reader/writer.

19. The RFID system according to claim 18, wherein the article houses the RFID tag in the random direction such that the opening plane of the first magnetic field antenna of the RFID tag forms any angle with the opening plane of the second magnetic field antenna of the reader/writer.

20. The RFID system according to claim 17, wherein the first magnetic field antenna of the RFID tag comprises an opening plane that is orthogonal to the opening plane of the second magnetic field antenna of the reader/writer when the conveying path conveys the article in the conveying direction.

* * * * *